United States Patent
Vargantwar et al.

(10) Patent No.: US 8,755,356 B1
(45) Date of Patent: Jun. 17, 2014

(54) METHODS AND SYSTEMS FOR DYNAMICALLY SELECTING REQUESTED FORWARD-LINK DATA RATE BASED ON C/I RATIO

(75) Inventors: Sachin R. Vargantwar, Overland Park, KS (US); Jason P. Sigg, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 283 days.

(21) Appl. No.: 13/109,269

(22) Filed: May 17, 2011

(51) Int. Cl.
*H04L 1/20* (2006.01)
*H04L 1/00* (2006.01)
*H04W 28/22* (2009.01)
*H04W 52/26* (2009.01)

(52) U.S. Cl.
CPC ............ *H04L 1/0002* (2013.01); *H04L 1/0021* (2013.01); *H04L 1/004* (2013.01); *H04W 52/26* (2013.01); *H04W 28/22* (2013.01)
USPC .......................................... 370/333; 370/330

(58) Field of Classification Search
USPC ................................................. 370/229–240
See application file for complete search history.

(56) References Cited

U.S. PATENT DOCUMENTS

| | | | | |
|---|---|---|---|---|
| 6,246,881 | B1* | 6/2001 | Parantainen et al. | 455/450 |
| 6,269,250 | B1* | 7/2001 | Bender et al. | 455/522 |
| 2004/0001462 | A1* | 1/2004 | Yavuz et al. | 370/333 |
| 2004/0165575 | A1* | 8/2004 | Yang et al. | 370/349 |
| 2004/0176043 | A1* | 9/2004 | Huh et al. | 455/67.13 |
| 2004/0179499 | A1* | 9/2004 | Sindhushayana et al. | 370/335 |
| 2006/0280160 | A1* | 12/2006 | Padovani et al. | 370/347 |
| 2011/0096857 | A1* | 4/2011 | Koo et al. | 375/260 |

* cited by examiner

*Primary Examiner* — Asad Nawaz
*Assistant Examiner* — Zhaohui Yang

(57) ABSTRACT

Disclosed herein are methods and systems according to which an access terminal intelligently accounts for variations in a set of C/I measurements taken by the access terminal during a pre-determined period of time, so as to more accurately select a desirable forward-link data rate. According to the method, the access terminal makes a first determination that a forward packet error rate (FPER) is greater than an FPER threshold, and makes a second determination that a last-requested forward-link data rate is not the lowest data rate among a plurality of requestable forward-link data rates. The access terminal then responsively identifies a carrier-to-interference-(C/I)-key value based at least in part on one or more C/I measurements taken by the access terminal, and then uses that identified C/I-key value to select—and then request service from a serving access node at—a next-requested forward-link data rate that is less than the last-requested forward-link data rate.

22 Claims, 8 Drawing Sheets

| SET OF C/I MEASUREMENTS | |
|---|---|
| 524A | 7 |
| 524B | 9 |
| 524C | 8 |
| 524D | 8 |
| 524E | 7 |
| 524F | 3 |
| 524G | 2 |
| 524H | 3 |

602A–602H correspond to rows 524A–524H of table 602.

| C/I-KEY VALUE | |
|---|---|
| AVERAGE | 5.875 |
| LESS THAN BUT CLOSEST TO AVERAGE | 3 |
| MEDIAN | 7 |
| LESS THAN BUT CLOSEST TO MEDIAN | 3 |
| LOWEST | 2 |
| AFTER EXCEEDED DIFFERENCE THRESHOLD | 3 |

604A–604F label the rows of table 604.

FIG. 6

METHODS AND SYSTEMS FOR DYNAMICALLY SELECTING REQUESTED FORWARD-LINK DATA RATE BASED ON C/I RATIO

BACKGROUND

1. Wireless-Communication Networks Generally

Many people use mobile devices, such as cell phones and personal digital assistants (PDAs), to communicate with wireless-communication networks. Mobile devices and wireless-communication networks typically communicate with each other over a radio-frequency (RF) air interface according to a wireless-communication protocol. One example of such a wireless-communication protocol is Code Division Multiple Access (CDMA). Additional examples of wireless-communication protocols include WiMAX, LTE, IDEN, GSM, WIFI, and HDSPA.

Mobile devices typically conduct these communications with one or more base transceiver stations (BTSs), which send communications to and receive communications from mobile devices over the air interface via carrier signals. Each BTS is typically in turn communicatively connected with an entity known as a base station controller (BSC), which (a) controls one or more BTSs and (b) acts as a conduit between the BTS(s) and one or more switches or gateways, such as a mobile switching center (MSC) and/or a packet data serving node (PDSN), which may in turn interface with one or more signaling and/or transport networks. Thus, a mobile device may communicate with one or more remote devices via one or more such networks by sending communications, perhaps in the form of data packets, by way of a BTS. Communications from a BTS to a mobile device are typically referred to as "forward link" communications, whereas communications from a mobile device to a BTS are typically referred to as "reverse link" communications.

According to a particular type of CDMA protocol known as EV-DO, which stands for "Evolution Data Optimized," networks provide service to mobile devices using a combination of time-division multiplexing (TDM) on the forward link and more-conventional CDMA technology on the reverse link. In the EV-DO context, a mobile device is typically referred to as an access terminal, while the network entity with which the access terminal communicates over the air interface is known as an access node. Such an access node may include a system of network devices, and typically includes a network entity known as a radio network controller (RNC), which is similar to a BSC.

In the balance of this written description, reference may be made to access terminals as examples of mobile devices, though this is for purposes of explanation and not to the exclusion of any other type of mobile device. Further, reference may be made to access nodes as examples of network entities with which an access terminal may communicate over an air interface, though this too is for explanation and not to the exclusion of any other type of network entity such as, but not limited to, a BTS. A particular access node with which an access terminal communicates may be referred to as a serving access node. Other access nodes in the wireless-communication network may be referred to as neighboring access nodes.

More generally, those of skill in the art will appreciate that aspects of this disclosure may be applied to various wireless-communication networks regardless of the particular configurations of such networks, and regardless of the particular wireless-communication protocols used by such networks.

2. Forward-Link Data Rate

As described above, communication between a serving access node and an access terminal may involve the serving access node sending packets to the access terminal on the forward link, and the access terminal sending packets to the serving access node on the reverse link. Focusing on the forward link, serving access nodes are generally able to transmit packets to access terminals at a number of different forward-link data rates. The particular forward-link data rates used by a serving access node may vary depending on, for example, the particular wireless-communication protocol according to which the access node operates. For instance, a given protocol may specify a plurality of forward-link data rates that may be used; and some or all of these forward-link data rates may be requestable by access terminals. In the context of EV-DO, available forward-link data rates are specified (i.e., represented) by—or at least associated with—particular data-rate control (DRC) values.

In some arrangements, an access terminal may be capable of requesting that a serving access node use a particular forward-link data rate for sending communications to the access terminal. In such arrangements, the access terminal may select a requested forward-link data rate based at least in part on an estimated carrier-to-interference (C/I) ratio of a signal received from the serving access node.

Generally, a C/I ratio provides an indication of the power of the signal received from the serving access node relative to the total power of interfering signals received from other transmitters, including other access nodes, in the wireless-communication network and/or any other transmitters, whether part of the same wireless-communication network or not. In typical arrangements, an access terminal may measure—at regular time intervals during a pre-determined recurring time period—the power of the signal received from the serving access node and the power of interfering signals received from other transmitters, and accordingly derive C/I measurements.

Such measurements may be used by the access terminal to estimate the C/I ratio of the signal emitted by the serving access node, as received by the access terminal. And it should be noted that the examples described herein that involve C/I ratios being determined in a manner where the "I" involves only signals from neighboring access nodes in the same network are used for clarity of presentation, and are not meant to imply that other types of interfering signals would not also or instead be present. And in fact some of the examples described herein refer explicitly to interfering signals emitted by transmitters other than neighboring access nodes.

In some arrangements, the pre-determined time period during which the access terminal makes C/I measurements may correspond to a coordinated "pilot-burst" time period, during which access nodes in the wireless-communication network emit a pilot signal. Such a pilot-burst time period may be specified by the particular wireless-communication protocol according to which the wireless-communication network operates. Access terminals may, however, make C/I measurements during other time periods instead or as well.

Generally, pilot signals are used by access nodes to convey certain control, synchronization, and/or reference information to access terminals. However, pilot signals may also be used by access terminals for C/I estimation. According to some protocols, and in particular some of those involving TDMA communications, access nodes transmit only pilot signals during the specified pilot-burst time period. Therefore, during the pilot-burst time period, C/I estimation may be carried out by the access terminal while the serving access node and neighboring access nodes emit only pilot signals. Accordingly, during such coordinated periods, access terminals may estimate C/I conditions in a relatively more rapid and/or accurate manner than may be possible, for example, during time periods of normal network communications. However, as discussed throughout the present disclosure, sources of wireless interference other than neighboring access nodes may exist in the vicinity of the wireless-communication network during the pilot-burst time period.

An access terminal may be arranged to associate particular C/I ratios with respective particular forward-link data rates. Accordingly, the access terminal may be arranged to request a forward-link data rate associated with an estimated C/I ratio. For example, in situations where the estimated C/I ratio is relatively low, indicating relatively high interference conditions, the access terminal might request a relatively low forward-link data rate, typically better enabling the access terminal to demodulate signals received from the serving access node.

Generally, demodulation at a relatively low rate enables an access terminal to extract information of interest from the carrier signal in a manner that is less error-prone, i.e. necessitating fewer (and perhaps no) retransmissions of data, than demodulation at a relatively high rate, particularly in the presence of high-interference conditions. Conversely, and other things being (substantially) equal, in relatively low interference conditions (high C/I ratio), an access terminal may request a relatively high forward-link data rate. On the one hand, it may be generally desirable for an access terminal to request a relatively high forward-link data rate, so as to receive data from the wireless-communication network at a high rate. On the other hand, however, use of a forward-link data rate that is unsuitably high for prevailing interference conditions typically tends to result in an increased incidence of errors in the demodulation of packets received by the access terminal, and thus a decrease in the effective rate of receiving data that—as a practical matter—is actually experienced by the access terminal.

As a general matter, it is quite typically the case that some of the packets received by an access terminal from an access node will contain errors, while some will not. A ratio can be computed between (i) the number of error-containing packets received by the access terminal (and perhaps a number of packets not received at all) from the access node over a given time period and (ii) the total number of packets received (or that should have been received) by the access terminal from the access node over that same time period. This ratio is known as the forward-link packet error rate (FPER). Generally, an access terminal may be arranged to request a forward-link data rate that corresponds to a desirable balance of data rate and error rate.

Overview

As discussed above, one factor that may cause an access terminal to experience an increased FPER is the use of an undesirably high forward-link data rate (as transmitted by the access node, as opposed to as effectively received at the access terminal). As also discussed above, the access terminal may request a particular forward-link data rate based, at least in part, on an estimated C/I ratio of a signal received from a serving access node (or, more generally, an evaluation of the prevailing wireless interference, or C/I conditions, in the wireless-communication network).

Thus, it is possible that the access terminal may request an undesirably high forward-link data rate as a result of an inaccurate evaluation of C/I conditions in the wireless-communication network. Generally, therefore, the access terminal may help increase the likelihood of the requested forward-link data rate being actually desirable by accurately analyzing C/I measurements taken with respect to signals received from the serving access node. In other words, it is desirable that access terminals avoid the so-called "garbage in, garbage out" (inaccurate C/I-measurement analysis in, undesirable requested forward-link data rate out) problem in at least this context.

Generally, there are innumerable potential causes of inaccuracy in analyzing C/I conditions in a wireless-communication network. Such causes of inaccuracy include innumerable potential sources of wireless interference itself and the fact that wireless interference caused by such sources may vary in time. One example of wireless interference, as noted above, is transmissions by neighboring access nodes. Such transmissions may be received by the access terminal at varying times depending on varying respective distances of the neighboring access nodes from the access terminal. Another example of wireless interference is receiver (i.e., access terminal) overload, whereby, if the access terminal comes too near to the serving access node, signals emitted by the serving access node may be so strong as to over-saturate the access terminal and create interference.

Yet another example of wireless interference is long-distance wireless interference, whereby the access terminal receives interfering signals emitted by transmitters (including, perhaps, access nodes that are not directly associated with the wireless-communication network of the serving access node) that are great distances away from the access terminal. Such long-distance interference may be caused, for instance, by "skip," whereby ionized gases in the ionosphere reflect transmitted signals back to earth at a great distance, or may be caused by "ducting," whereby air of different temperatures and humidity forms layers in the lower atmosphere, and causes signals to be refracted and reflected at much greater distances than normal.

Yet another example still of wireless interference is general RF interference that may be caused by radio equipment other than that associated the wireless-communication network, such as electric motors and faulty spark plug wires, as examples. And natural phenomena such as lightning and solar activity may also cause interference with the carrier signal received by the access terminal from the serving access node. Other examples of sources of wireless interference exist as well.

As noted above, access nodes may be arranged to emit pilot signals at a pre-determined time (perhaps according to a pre-defined pilot-burst time period), and access terminals may be arranged to perform C/I measurements during a corresponding period of time. However, due to the fact that levels of wireless interference received by the access terminal may vary with time, not all interfering signals may be present at the access terminal at the same time. In particular, not all interfering signals may be present during all, or at least part of, the period of time during which the access terminal performs C/I measurements.

Thus, it is possible that the access terminal may perform C/I measurements when the pilot signal emitted by the serving access node has been received, but all interfering signals have not. If the access terminal were to use such C/I measurements in an evaluation of the C/I conditions in the wireless-communication network, the access terminal may underestimate the true total power of interfering signals in the wireless-communication network. As a result, the access terminal may overestimate the quality of C/I conditions and, ultimately, may request an undesirably high forward-link data rate. Because the access node may not be aware that the requested forward-link data rate is undesirably high (and there may not be another safeguard in place against such an issue), the access node may grant such a request, leading to use of an undesirably high forward-link data rate by the access terminal, and to the typically resultant problems described above, and/or one or more other problems.

Disclosed herein are method and systems according to which an access terminal intelligently accounts for variations in a set of C/I measurements taken by the access terminal during a pre-determined period of time, so as to more accurately evaluate C/I conditions in a wireless-communication network. According to at least one embodiment taking the form of a method, the access terminal makes a first determination that an FPER with respect to data received by the access terminal from the serving access node is greater than an FPER threshold. Such a first determination may be interpreted (at least implicitly) by the access terminal as an indication (e.g., an increased likelihood) that an undesirably high forward-link data rate (for example, a last-requested forward-link data rate) was previously requested, perhaps as a result of an inaccurate evaluation of C/I conditions by access terminal 102.

The access terminal then makes a second determination that the last-requested forward-link data rate is not the lowest data rate among a plurality of requestable forward-link data rates. That is, as noted above, the wireless-communication protocol according to which the access terminal operates may specify a plurality of requestable forward-link data rates, and the access terminal may determine that, of those specified requestable forward-link data rates, the forward-link data rate that it last requested was not the lowest requestable forward-link data rate.

Responsive to making both the first and second determinations, the access terminal may then identify a C/I-key value based at least in part on one or more C/I measurements from among the set of C/I measurements taken by the access terminal with respect to one or more signals received from the serving access node. Identification of the C/I-key value may involve an analysis of the C/I measurements taken by, and/or various C/I ratios estimated by, the access terminal.

Generally, the access terminal may then select, based at least in part on the identified C/I-key value, a next-requested (i.e., next-to-be-requested) forward-link data rate from among the one or more data rates in the plurality that are less than the last-requested forward-link data rate. Thus, the access terminal may be configured so as to identify, based at least in part on one or more C/I measurements from among a set of C/I measurements taken by the access terminal, a C/I-key value that corresponds to a next-requested forward-link data rate that is less than the last-requested forward-link data rate.

There are many ways in which the access terminal could identify a C/I-key value. As a few examples, the identified C/I-key value may be at least one of: an average of the C/I measurements in the set; a C/I measurement that is, among those C/I measurements in the set that are less than the average of all of the C/I measurements in the set, closest in value to the average; a median of the C/I measurements in the set; and a C/I measurement that is, among those C/I measurements in the set that are less than the median, closest in value to the median. As another example, the identified C/I-key value may be the lowest C/I measurement in the set of C/I measurements. And these are but a few examples.

As noted, ultimately, the access terminal may select a next-requested forward-link data rate based on the identified C/I-key value. The access terminal may be configured to, for example, select as the next-requested forward-link data rate a forward-link data rate that is associated with the C/I-key value, or perhaps to calculate the next-requested forward-link data rate based at least in part on the C/I-key value. The access terminal may then request forward-link service from the serving access node at the next-requested forward-link data rate. In this way, the access terminal may help increase the likelihood of the next-requested forward-link data rate being a desirable one, at least in part by selecting the next-requested forward-link data rate based on the identified C/I-key value. By using a dynamic analysis of C/I measurements, the present methods and systems may generally provide for increased accuracy in the selection and ensuing requesting of appropriate forward-link data rates.

These, as well as other, aspects and advantages will become apparent to those of ordinary skill in the art by reading the following detailed description, with reference where appropriate to the accompanying drawings.

BRIEF DESCRIPTION OF THE DRAWINGS

FIG. 6 depicts example C/I-measurement values and example C/I-key values, in accordance with at least one embodiment.

DETAILED DESCRIPTION

1. Examples of Architecture a. Example Communication System

Figure 1:
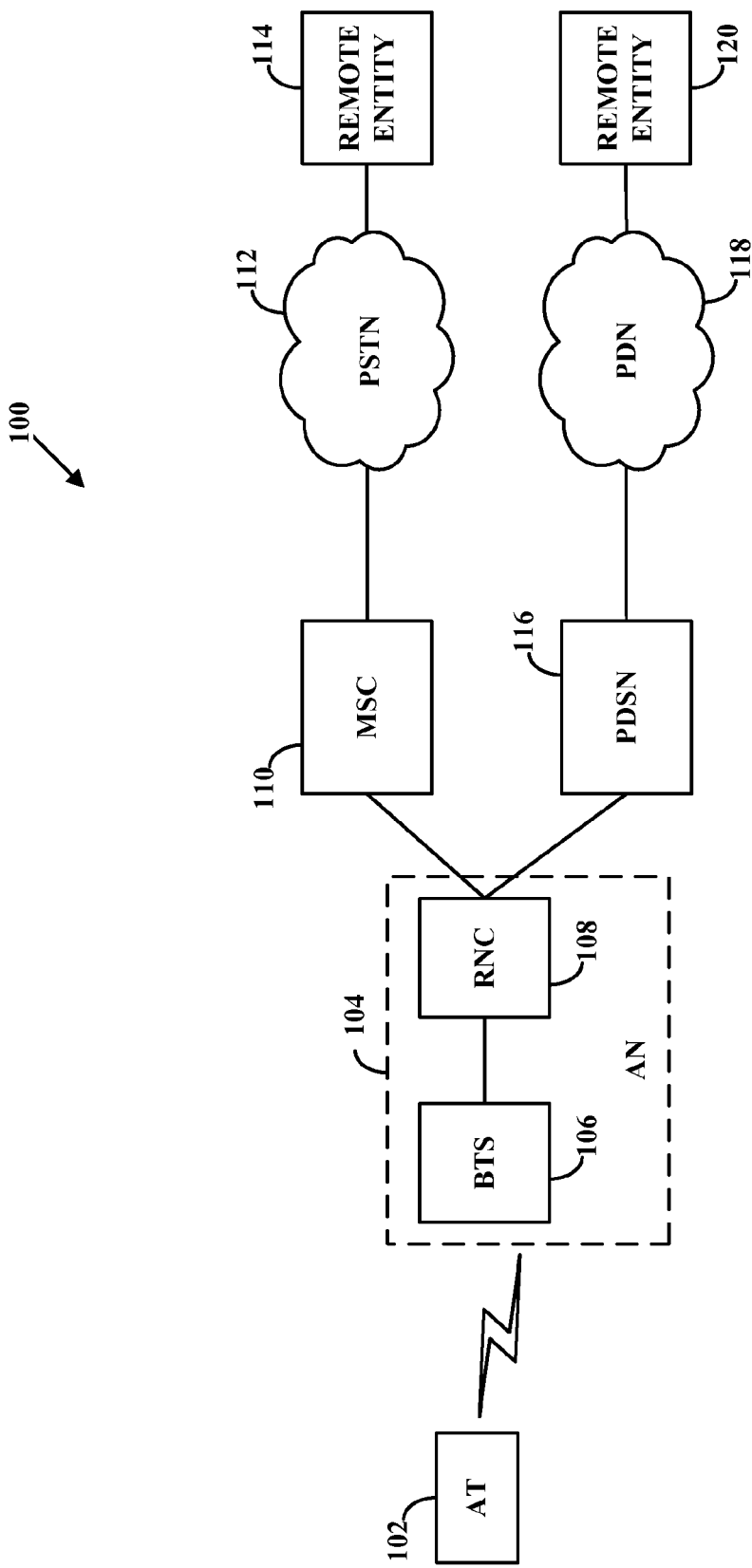
FIG. 1 is a simplified block diagram of an example communication system in which at least one embodiment could be implemented.

FIG. 1 is a simplified block diagram of an example communication system in which at least one embodiment can be implemented. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components, or in conjunction with other components, and in any suitable combination and location. Various functions described herein as being performed by one or more entities may be carried out by hardware, firmware, and/or software—some may be carried out by a processor executing instructions stored in memory.

As shown in FIG. 1, example communication system 100 includes access terminal (AT) 102, access node (AN) 104 (shown as comprising base transceiver station (BTS) 106 and radio network controller (RNC) 108), mobile switching center (MSC) 110, public switched telephone network (PSTN) 112, packet data serving node (PDSN) 116, and packet-data network (PDN) 118. Additional entities could be present as well or instead. For example, there could be additional access terminals in communication with BTS 106; furthermore, there could be additional entities in communication with PSTN 112 and/or PDN 118. Also, there could be one or more devices and/or networks making up at least part of one or more of the communication links. For example, there could be one or more routers, switches, or other devices or networks on the link between PDSN 116 and PDN 118.

Access terminal 102 may be any access terminal arranged to carry out the access terminal functions described herein. As such, access terminal 102 may include a user interface, a wireless-communication interface, a processor, and data storage comprising instructions executable by the processor for carrying out those access terminal functions. Access terminal 102 is further described below in connection with FIG. 2.

BTS 106 may be any network element arranged to carry out the BTS functions described herein. As such, BTS 106 may include a communication interface, a processor, and data storage comprising instructions executable by the processor to carry out those BTS functions. The communication interface may include one or more antennas, chipsets, and/or other components for providing one or more wireless-coverage areas such as cells and sectors, for communicating with access terminals, such as access terminal 102, over an air interface. The communication interface may be arranged to communicate according to one or more communication protocols mentioned herein and/or any others now known or later developed. The communication interface may also include one or more wired and/or wireless interfaces for communicating with at least RNC 108.

RNC 108 may be any network element arranged to carry out the RNC functions described herein. As such, RNC 108 may include a communication interface, a processor, and data storage comprising instructions executable by the processor to carry out those RNC functions. The communication interface may include one or more wired and/or wireless interfaces for communicating with at least BTS 106, MSC 110, and PDSN 116. In general, RNC 108 functions to control one or more BTSs such as BTS 106, and to provide one or more BTSs such as BTS 106 with connections to other devices such as MSC 110 and PDSN 116.

MSC 110 may be any networking element arranged to carry out the MSC functions described herein. As such, MSC 110 may include a communication interface, a processor, and data storage comprising instructions executable by the processor to carry out those MSC functions. The communication interface may include one or more wired and/or wireless interfaces for communicating with at least RNC 108 and PSTN 112. In general, MSC 110 functions as a switching element between PSTN 112 and one or more RNCs such as RNC 108, facilitating communication between access terminals and PSTN 112, which may be the well-known public switched telephone network. With this arrangement, access terminal 102 may communicate with remote entity 114 through a communication path comprising BTS 106, RNC 108, MSC 110, and PSTN 112. Remote entity 114 may be, for example, a remote telephone device.

PDSN 116 may be any networking element arranged to carry out the PDSN functions described herein. As such, PDSN 116 may include a communication interface, a processor, and data storage comprising instructions executable by the processor for carrying out those PDSN functions. The communication interface may include one or more wired and/or wireless interfaces for communicating with at least RNC 108 and PDN 118. In general, PDSN 116 functions as a network access server between PDN 118 and RNCs such as RNC 108, facilitating packet-data communication between access terminals and PDN 118. With this arrangement access terminal 102 may communicate with remote entity 120 through a communication path comprising BTS 106, RNC 108, PDSN 116, and PDN 118. Remote entity 120 may be, for example, a remote computer.

PDN 118 may include one or more wide area networks, one or more local area networks, one or more public networks such as the Internet, one or more private networks, one or more wired networks, one or more wireless networks, and/or one or more networks of any other type. In one example, PDN 118 may include both the Internet and a private core packet-data network operated by a wireless carrier that operates BTS 106, RNC 108, etc. Devices in communication with PDN 118 may exchange data using a packet-switched protocol such as the Internet Protocol (IP), and may be identified by an address such as an IP address.

b. Example Access Terminal

Figure 2:
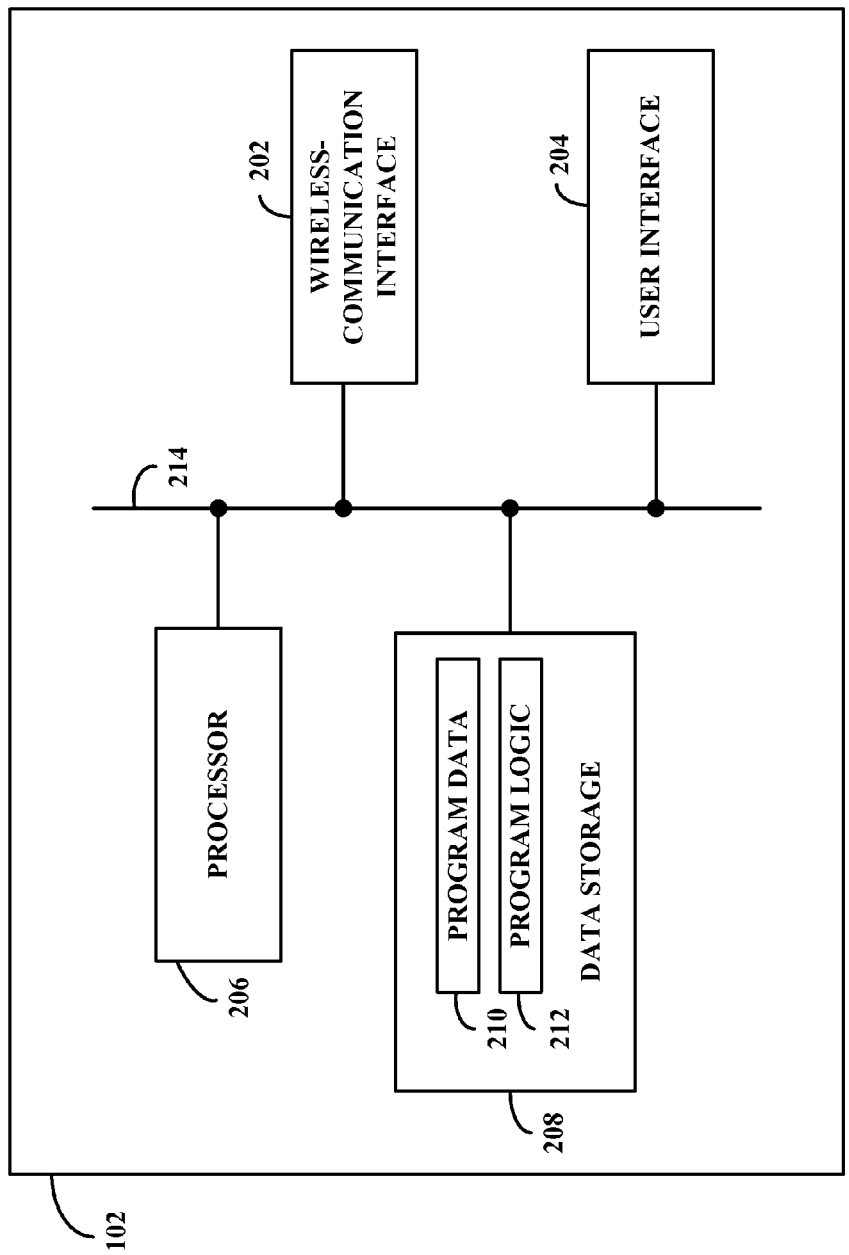
FIG. 2 is a simplified block diagram of an access terminal arranged to implement aspects of at least one embodiment.

FIG. 2 is a simplified block diagram of an access terminal arranged to implement at least one embodiment. As shown, access terminal 102 includes a wireless-communication interface 202, a user interface 204, a processor 206, and data storage 208, all of which may be communicatively linked together by a system bus, network, and/or other connection mechanism 214.

Wireless-communication interface 202 functions to facilitate air-interface communication with BTS 106. Wireless-communication interface 202 may comprise an antenna and a chipset for communicating with one or more BTSs over an air interface. As an example, the chipset could be one that is suitable for CDMA communication, including EV-DO communication. The chipset or wireless-communication interface in general may also or instead be arranged to communicate according to one or more other types of wireless communication (e.g. wireless-communication protocols) mentioned herein and/or any others now known or later developed.

User interface 204 may include one or more components for receiving input from a user of access terminal 102, as well as one or more components for providing output to a user of access terminal 102. User interface 204 may include buttons, a touchscreen, a microphone, and/or any other elements for receiving inputs, as well as a speaker, one or more displays, and/or any other elements for communicating outputs. Further, user interface 204 may include analog/digital conversion circuitry to facilitate conversion between analog user input/output and digital signals with which access terminal 102 can operate.

Processor 206 may comprise one or more general-purpose processors (such as INTEL processors or the like) and/or one or more special-purpose processors (such as digital-signal processors or application-specific integrated circuits). To the extent processor 206 includes more than one processor, such processors could work separately or in combination. Further, processor 206 may be integrated in whole or in part with wireless-communication interface 202 and/or with other components.

Data storage 208, in turn, may comprise one or more volatile and/or non-volatile storage components, such as magnetic, optical, or organic memory components. As shown, data storage 208 may include program data 210 and program logic 212 executable by processor 204 to carry out various access-terminal functions. Although these components are described herein as separate data-storage elements, they could just as well be physically integrated together or distributed in various other ways. For example, program data 210 may be maintained in data storage 208 separate from program logic 212, for easy updating and reference by program logic 212.

Program data 210 may include various other data used by access terminal 102 in operation. As an example, program data 210 may include data-rate data, perhaps in the form of a look-up table, that correlates particular forward-link data rates with particular C/I-key values. As another example, program data 210 may include FPER-threshold data that may be used, by comparison with calculated FPERs, to determine that it may be desirable to select a forward-link data rate in accordance with at least one embodiment. Other examples of program data are possible as well. Program data 210 is discussed further below.

Any such data may be stored by access terminal 102 together in the same data table in program data 210. Alternatively, such data may be stored separately in separate data tables in program data 210. Of course, many other examples and ways of organizing program data 210 may be possible as well.

2. Example Operation

Figure 3A:
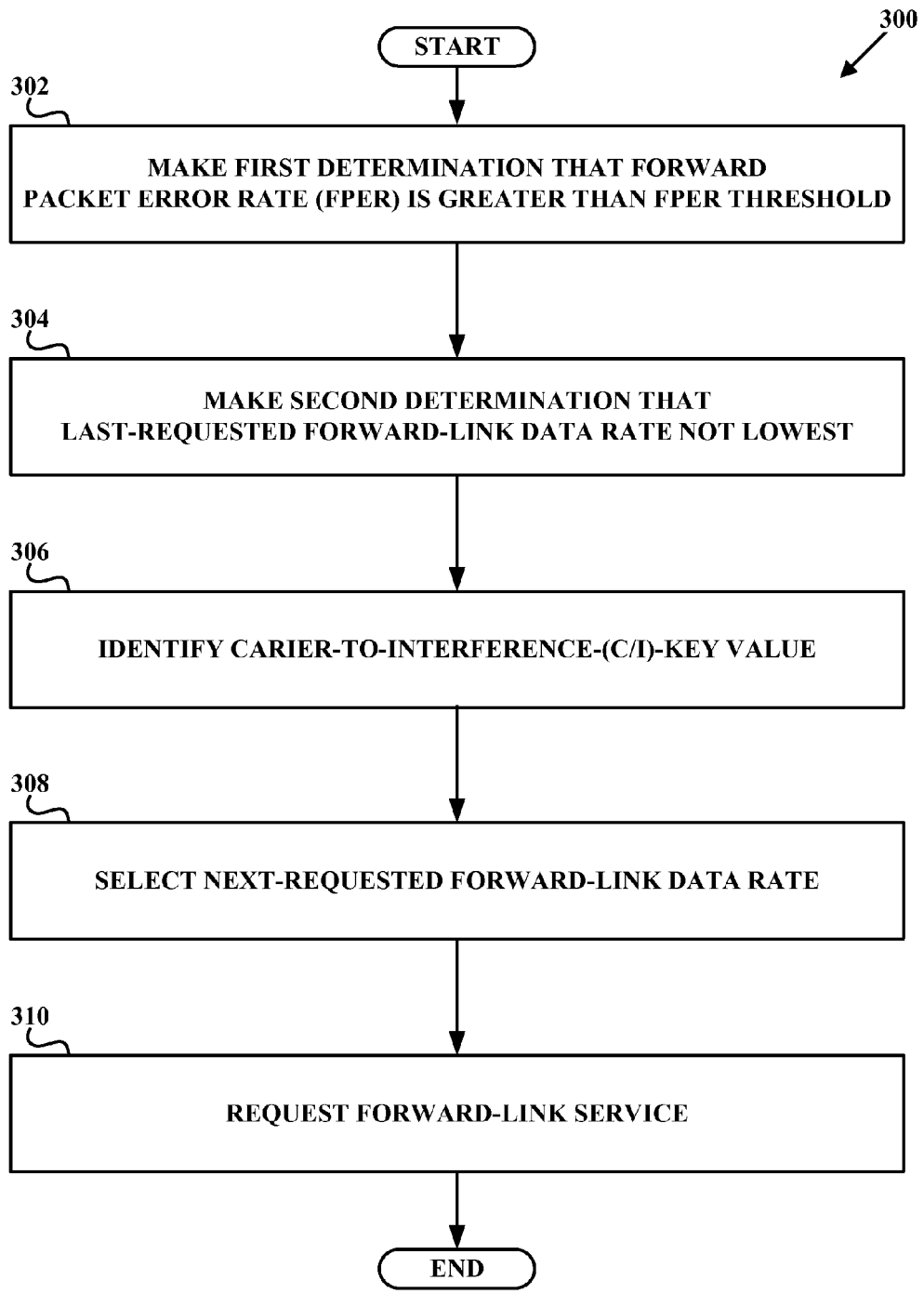
FIGS. 3A-3C are flowcharts depicting functions that can be carried out in accordance with at least one embodiment.
Figure 4:
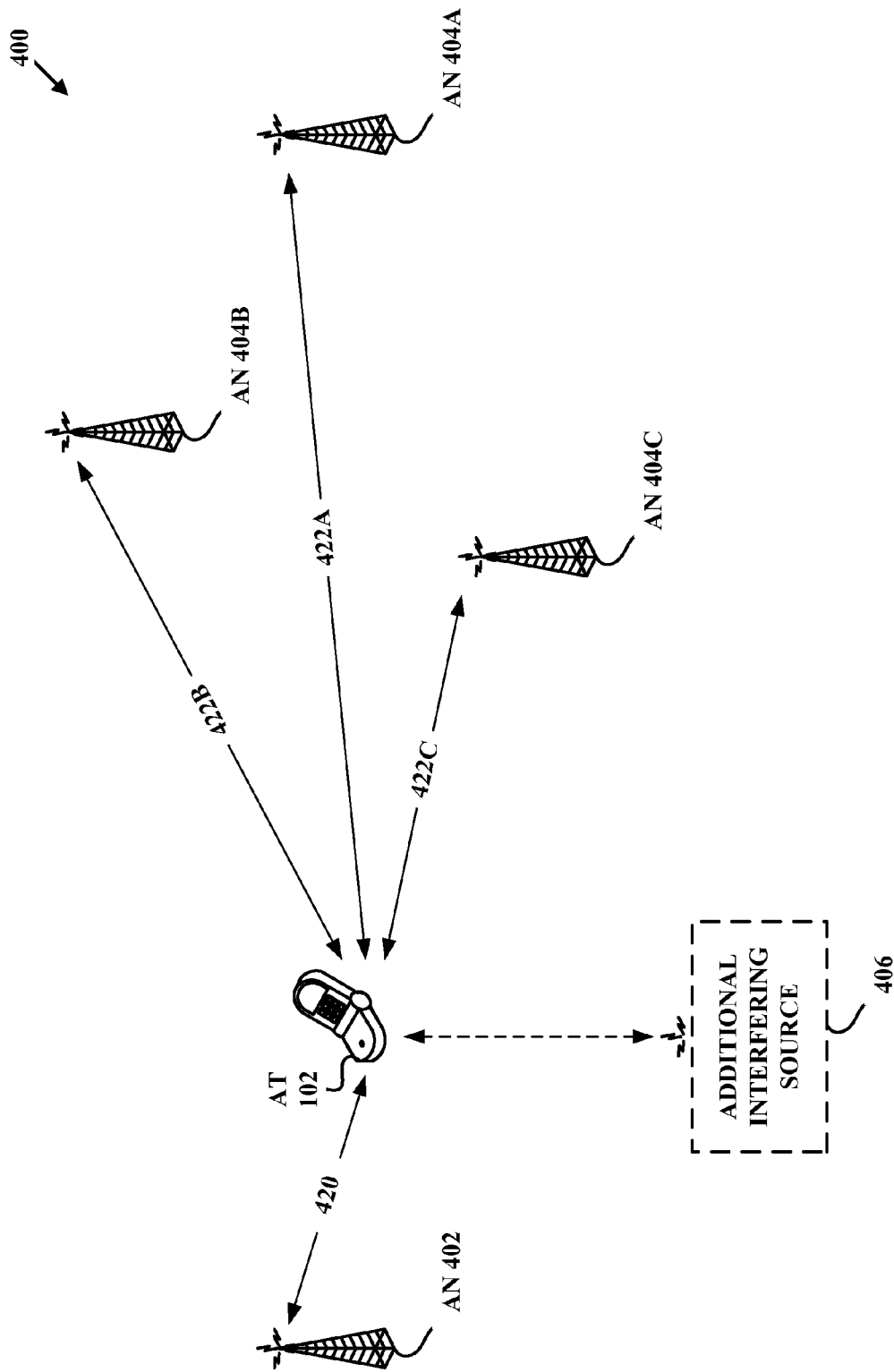
FIG. 4 is a simplified block diagram of an access terminal in an example wireless-communication network, in accordance with at least one embodiment.

FIG. 3A is a flowchart depicting functions that can be carried out in accordance with at least one embodiment. Generally, these functions may be carried out in a wireless-communication network by an access terminal, such as access terminal 102, that is being served by a serving access node. The wireless-communication network may additionally include one or more neighboring access nodes. For example, and with reference to FIG. 4, method 300 may be carried out by access terminal 102 in wireless-communication network 400 which includes serving access node 402, neighboring access nodes 404A, 404B, and 404C, as well as additional interfering source 406. It should be understood that wireless-communication network 400 is set forth for purposes of example and explanation only, and should not be taken to be limiting. One or more embodiments may just as well be carried out in other wireless-communication networks having other arrangements.

As shown in FIG. 3A, method 300 begins at step 302 when access terminal 102 makes a first determination that a forward packet error rate (FPER) with respect to data received by access terminal 102 from serving access node 402 is greater than an FPER threshold. At step 304, access terminal 102 makes a second determination that a last-requested forward-link data rate is not the lowest data rate among a plurality of requestable forward-link data rates. At step 306, responsive to making both the first and second determinations, access terminal 102 identifies a carrier-to-interference-(C/I)-key value based at least in part on one or more C/I measurements from among a set of C/I measurements taken by access terminal 102 with respect to one or more signals received from serving access node 402. At step 308, access terminal 102 selects, based at least in part on the identified C/I-key value, a next-requested forward-link data rate from among the one or more data rates in the plurality that are less than the last-requested forward-link data rate. And at step 310, access terminal 102 requests forward-link service from serving access node 402 at the selected next-requested forward-link data rate. Each of these steps is discussed further below.

Figure 3B:
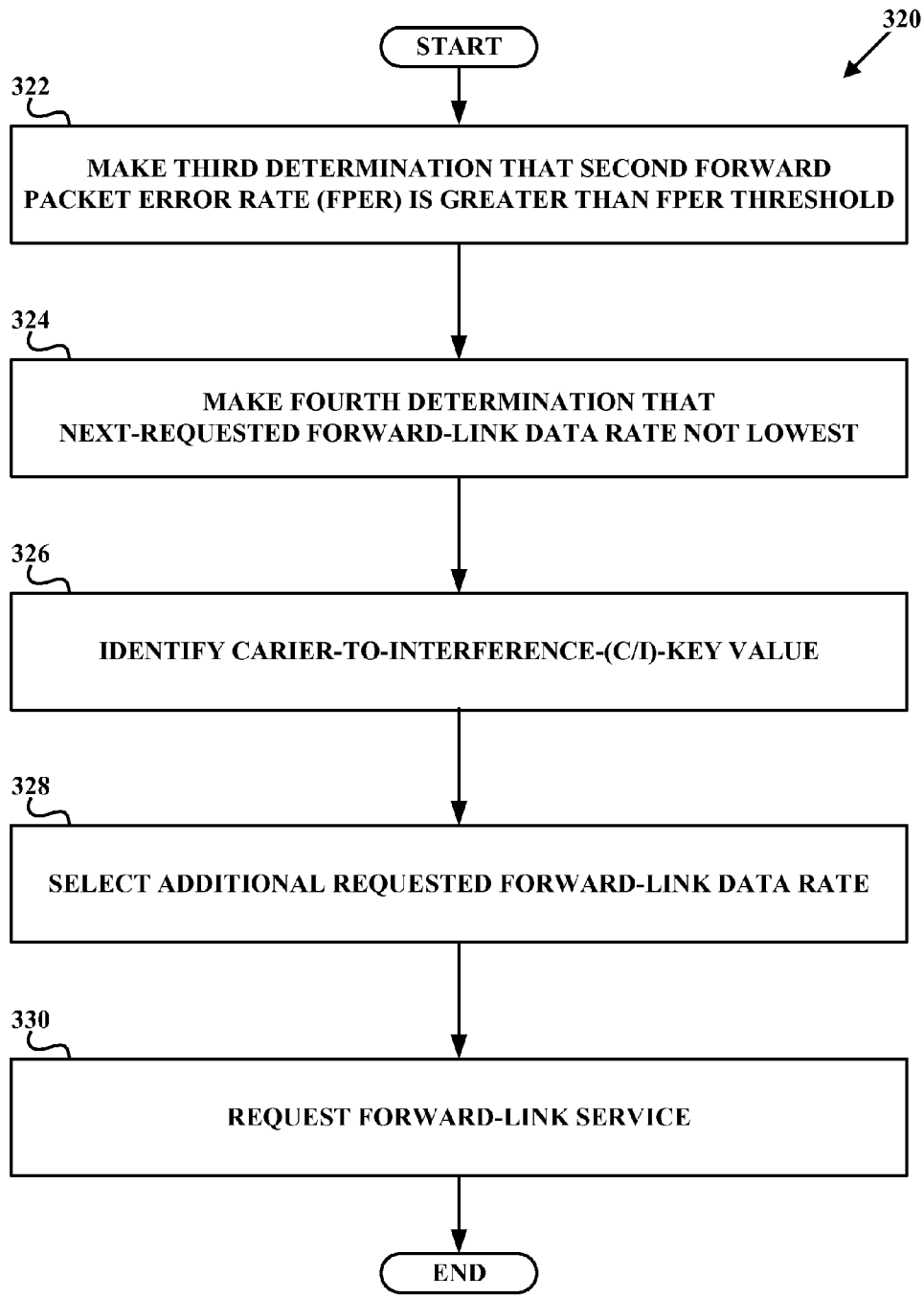
Figure 3C:
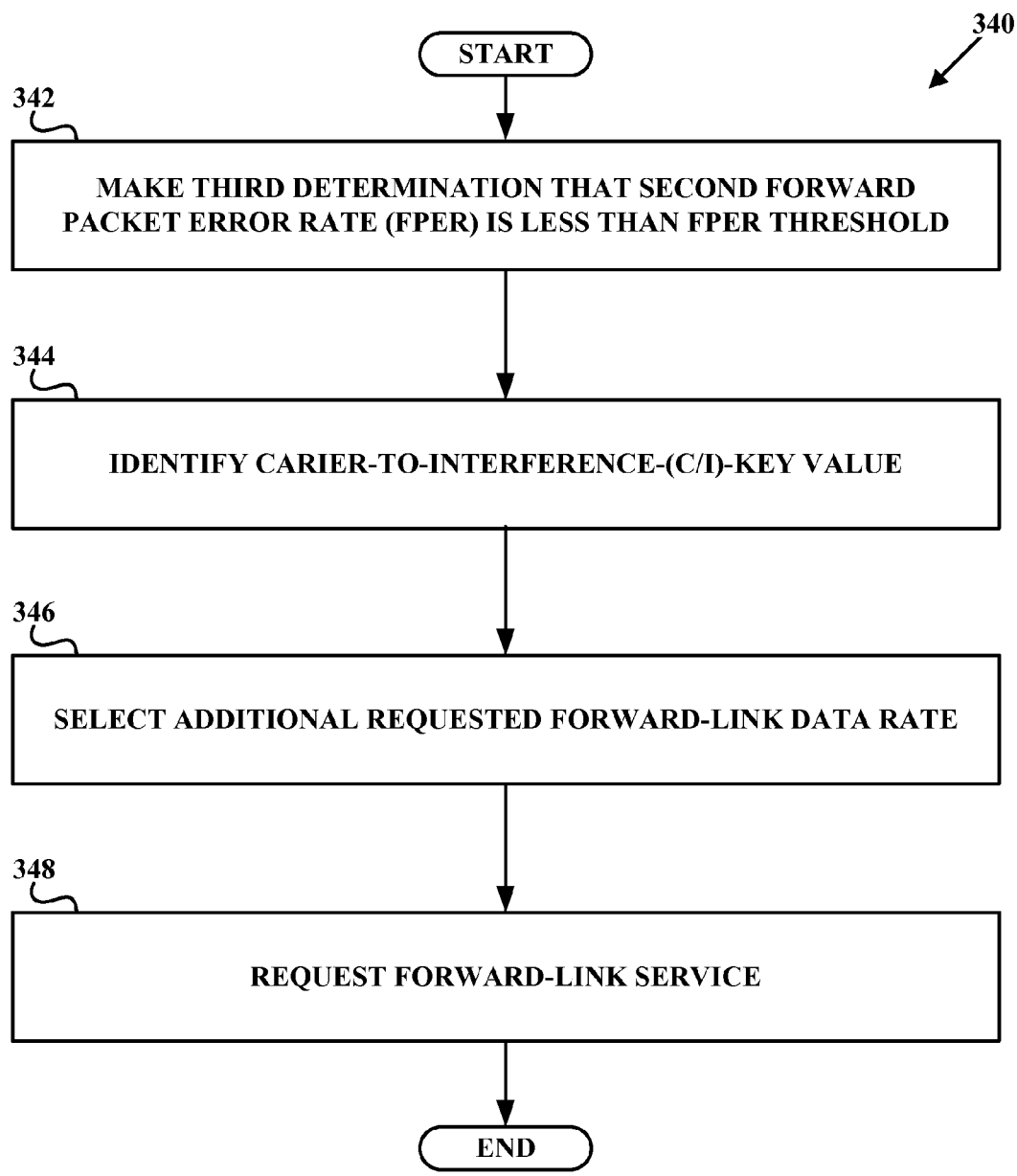

FIGS. 3B-3C are flowcharts depicting additional optional functions that may be carried out in accordance with at least one embodiment. Generally, the functions depicted in FIGS. 3B-3C may be carried out after access terminal 102 carries out those functions depicted in FIG. 3A. As will be described further below, the functions depicted in FIGS. 3B-3C may help access terminal 102 to continuously refine its selection of a requested forward-link data rate even after requesting forward-link service at the next-requested forward-link rate.

As noted above, one or more embodiments may enable access terminal 102 to take into account variations in C/I measurements taken by access terminal 102 during a predetermined period of time so as to accurately evaluate C/I conditions in the wireless-communication network and ultimately select a desirable requested forward-link data rate. According to one aspect of the methods described herein, access terminal 102 may help ensure the desirability of a next-requested forward-link data rate by selecting the next-requested forward-link data rate based on a C/I-key value identified according to an analysis of the C/I measurements.

Figure 5:
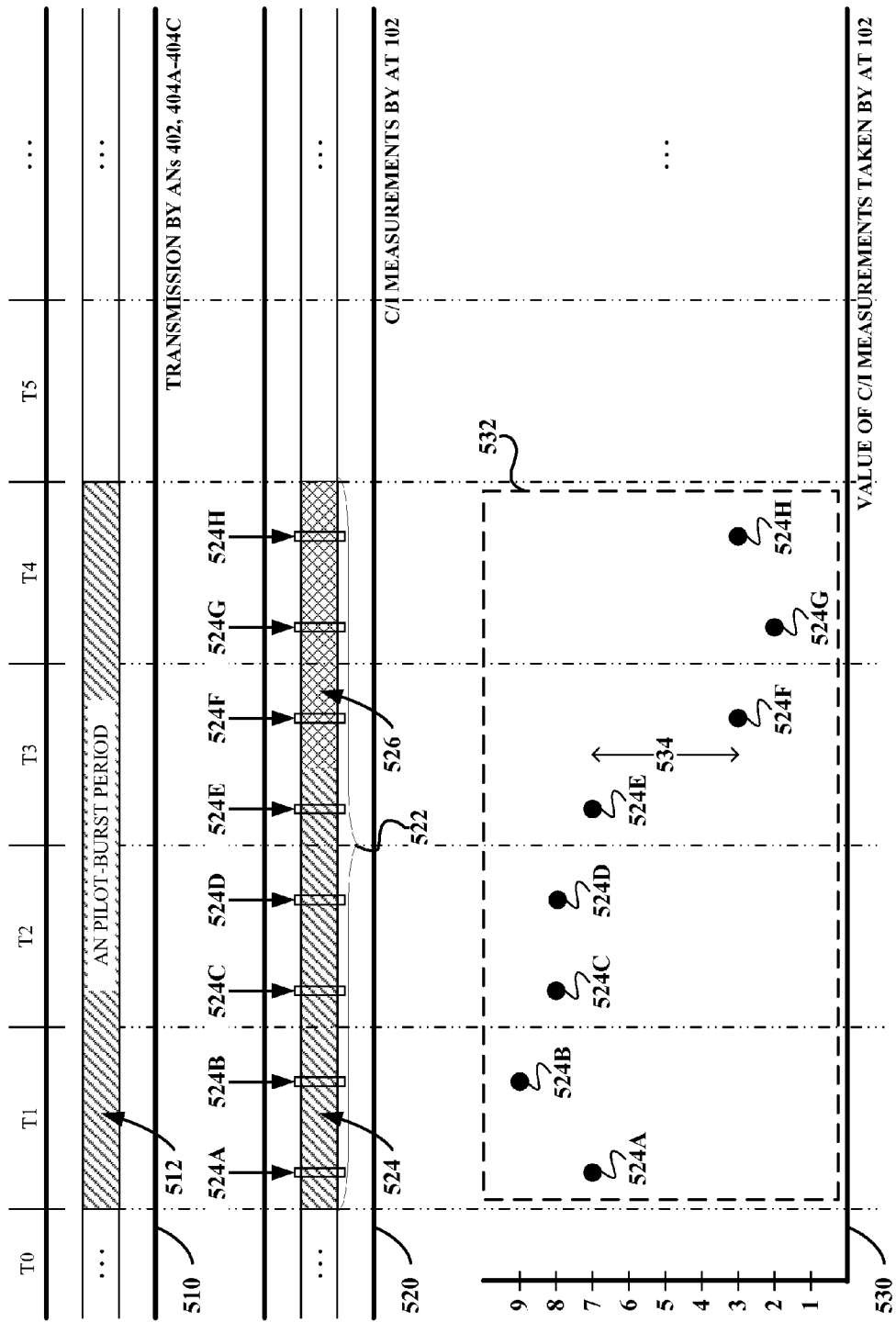
FIG. 5 depicts an example timing diagram and example carrier-to-interference (C/I) measurements, in accordance with at least one embodiment.

Before turning to a more detailed description of the methods depicted in FIGS. 3A-3C, brief reference to FIG. 5 provides an overview of some concepts relevant to the analysis of the C/I measurements. FIG. 5 depicts a number of time slots T0-T5 which, taken together, reflect that wireless-communication network 400, including access terminal 102, and access nodes 402, 404A, 404B, and 404C operate in a time-synchronized manner. It should be understood that such time slots are shown for purposes of example and explanation only, and are not necessarily intended to be representative of actual time slots of any particular wireless-communication protocol. Instead, FIG. 5 depicts, among other concepts, the concept of transmission and receipt of particular signals, in this case pilot signals, in a time-synchronized manner, for purposes of explanation of the methods depicted in FIGS. 3A-3C.

As described further below, FIG. 5 also depicts the concept of access terminal 102 receiving interfering signals other than pilot signals including receiving interfering signals at varying points in time. Such concepts may be applicable to various wireless-communication networks in accordance with the particular wireless-communication protocols according to which the various wireless-communication networks operate.

FIG. 5 depicts timing diagram 510, which shows pilot-burst transmissions by serving access node 402 and neighboring access nodes 404A-404C. Note that, during the time period corresponding to time slots T1-T4, serving access node 402 and neighboring access nodes 404A-404C emit pilot bursts (or pilot signals), collectively represented by pilot-burst time period 512. Correspondingly, as shown by timing diagram 520, access terminal 102 may be configured to make C/I measurements 524A-534H at regular time intervals during C/I-evaluation time period 522, which is equal in duration to pilot-burst time period 512.

Note, however, that it may be the case that, due to the respective time delay in receipt of the pilot bursts (arising from, among other things, varying respective distances 420, 422A, 422B, and 422C of the access nodes from access terminal 102), access terminal 102 may not receive the respective pilot burst from any of neighboring access nodes 404A-404C until some time after receiving the respective pilot burst from serving access node 402. Also, note that at some point during C/I-evaluation time period 522, access terminal 102 may begin (and continue) to receive an interfering signal from some source other than one of neighboring access nodes 404A-404C, such as additional interfering source 406. Additional interfering source 406 may be any one or more of those various sources of wireless interference described above.

With reference to timing diagram 520, interfering signals received in accordance with pilot-burst period 512 of wireless-communication network 400 are depicted as received-interfering signals 524 (as shown as forward slashes on timing diagram 520). Interfering signals received, including those emitted by some source other than one of neighboring access nodes 404A-404C, such as additional interfering source 406, are depicted as received-interfering signals 526 (as shown as cross hashes on timing diagram 520, which may include received-interfering signals 524). It should be understood that timing diagram 520 depicts simplified representations of received interference signals that are shown for purposes of example and explanation only, and are not necessarily intended to be representative of actual received-interfering signals.

As a result of at least the potential timing differences in received-interfering signals 524 and received-interfering signals 526, C/I measurements 524A-524E may be taken at a time during which interference conditions vary significantly from interference conditions at a time during which C/I measurements 524F-524H are taken. Thus, C/I measurements 524A-524E may lead access terminal 102 to overestimate the quality of C/I conditions in wireless-communication network 400, as they do not accurately account for the additional interference present in received-interfering signals 526.

That is, while the strength of signals associated with pilot burst 512 is measured during C/I measurements 524A-524E, the strength of signals associated with additional interfering source 406 (as indicated by received-interfering signals 526) is not. Therefore C/I measurements 524A-524E may provide an inaccurately low indication of the level of interference actually present in wireless-communication network 400. If access terminal 102 were to fail to accurately account for the changing interference conditions during C/I-evaluation time period 522, access terminal 102 may estimate the quality of C/I conditions to be erroneously high.

Accordingly, the methods depicted in FIGS. 3A-3C provide a way for access terminal 102 to identify a C/I-key value for use in selection of a requested forward-link data rate, in a manner that accurately accounts for actual interference conditions in wireless-coverage area 400.

Access terminal 102 may carry out particular functions depicted in the methods of FIGS. 3A-3C each time it evaluates C/I conditions. However, in at least one embodiment, access terminal 102 may carry out one or more such functions in response to receiving some indication that C/I conditions likely have been previously inaccurately evaluated. As described above, one such indication may be that access terminal 102 is experiencing an undesirably high FPER. Thus, access terminal 102 may carry out the methods depicted in FIGS. 3A-3C in response to first making a determination that the FPER with respect to data received from serving access node 402 is greater than an FPER threshold.

a. Make First Determination that FPER is Greater than FPER Threshold

Accordingly, method 300 begins at step 302 when access terminal 102 makes a first determination that a forward packet error rate (FPER) with respect to data received by access terminal 102 from serving access node 402 is greater than an FPER threshold. Such an FPER threshold may be set at a value that reflects an FPER that is undesirably high (perhaps as specified by a service provider that manages the wireless-communication network, or perhaps as specified by a user of access terminal 102). As described above, such an FPER threshold may be stored in program data 210 for easy access and reference by access terminal 102.

b. Make Second Determination that the Last-Requested Forward-Link Data Rate is not the Lowest Requestable Rate At step 304, access terminal 102 makes a second determination that a last-requested forward-link data rate is not the lowest data rate among a plurality of requestable forward-link data rates. In accordance with step 304, access terminal 102 may have previously requested forward-link service from serving access node 402 at a particular forward-link data rate.

In this way, for the purposes of method 300, the most recently requested forward-link data rate, or the last-requested forward-link data rate, is presumed to correspond to—if not exactly match—the forward-link data rate at which access terminal 102 is currently being served by serving access node 402.

As noted above, the wireless-communication protocol according to which wireless-communication network 400, including access terminal 102 and access node 402, operates may specify a plurality of requestable forward-link data rates. Generally, such requestable forward-link data rates will be differing values, which may generally be sorted by access terminal 102, perhaps from lowest to greatest. By making the second determination that the last-requested forward-link data rate is not the lowest requestable forward-link data rate, access terminal 102, at least implicitly, identifies (i.e., confirms) that there is at least one requestable forward-link data rate available that is less than the last-requested forward-link data rate.

c. Identify C/I-Key Value

At step 306, responsive to making both the first and second determinations, access terminal 102 identifies a carrier-to-interference-(C/I)-key value based at least in part on one or more C/I measurements from among a set of C/I measurements taken by access terminal 102 with respect to one or more signals received from serving access node 402. As shown with respect to FIG. 5, access terminal 102 may take C/I measurements 524A-524H during C/I measurement period 522, resulting in set of C/I measurements 532.

As shown by C/I-measurement chart 530, each of C/I measurements 524A-524H may differ in value. Generally, such differences may be minimal (perhaps due to slight variations in continual sources of wireless interference) or considerable (perhaps due to a new source of wireless interference). It should be understood that the depicted values of C/I measurements 524A-524H are for purposes of example and explanation only.

The particular values of C/I measurements 524A-524H are enumerated in FIG. 6 by C/I-measurement table 602. More particularly, value 602A indicates that C/I-measurement 524A has a relative value of 7, value 602B indicates that C/I-measurement 524B has a relative value of 9, value 602C indicates that C/I-measurement 524C has a relative value of 8, value 602D indicates that C/I-measurement 524D has a relative value of 8, value 602E indicates that C/I-measurement 524E has a relative value of 7, value 602F indicates that C/I-measurement 524F has a relative value of 3, value 602G indicates that C/I-measurement 524G has a relative value of 2, and value 602H indicates that C/I-measurement 524H has a relative value of 3.

The C/I-key value may generally be identified by access terminal 102 based on any desired evaluation and/or analysis of all, or part, of a set of C/I measurements such as C/I measurements 524A-524H in this example. C/I-key-value table 604 indicates some examples of C/I key values. As one example, the C/I-key value may be an average of C/I measurements 524A-524H. For instance, C/I-key value 604A, which is an average of C/I measurements 524A-524H, has a value of 5.875.

As another example, the C/I-key value may be a C/I measurement that is, among those C/I measurements 524A-524H that are less than the average of C/I measurements 524A-524H, closest in value to the average. For instance, C/I-key value 604B, which is less than the average value 5.875, but otherwise closest in value to the average value 5.875, has a value of 3.

As another example, the C/I-key value may be a median of C/I measurements 524A-524H. For instance, C/I-key value 604C, which is the median of C/I measurements 524A-524H, has a value of 7.

As another example, the C/I-key value may be a C/I measurement that is, among C/I measurements 524A-524H that are less than the median of C/I measurements 524A-524H, closest in value to the median. For instance, C/I-key value 604D, which is less than the median value 7, but otherwise closest in value to the median value 7, has a value of 3.

As another example, the C/I-key value may be the C/I measurement that is the lowest C/I measurement of C/I measurements 524A-524H. For instance, C/I-key value 604E, which is the lowest C/I measurement of C/I measurements 52A-524H (which, in this example corresponds to C/I measurement 524G), has a value of 2.

And as yet another example, access terminal 102 may be configured to identify that a considerable change in C/I measurement values occurred during C/I-measurement time period 522 (perhaps as a result of access terminal 102 beginning to receive additional interfering signals from an additional interfering source such as additional interfering source 406), and therefore may identify as the C/I-key value a C/I measurement taken after the significant change in C/I measurement values. That is, access terminal 102 may determine that a difference between a first C/I measurement and a second C/I measurement exceeds a difference threshold, where the second C/I measurement is greater than the first C/I measurement, where the second C/I measurement is, among those C/I measurements 524A-524H that are greater than the first C/I measurement, closest in value to the first C/I measurement, and where identifying the C/I-key value includes identifying as the C/I-key value the first C/I measurement. In other words, access terminal 102 may be configured to identify a drop-off in the respective value of C/I measurements 524A-524H, and select as the C/I-key value a C/I measurement that occurred after the drop-off.

With reference to FIG. 5, the C/I-key value may be selected in accordance with drop-off 534. For instance, in accordance with the example shown in FIG. 5, the difference threshold may be set equal to 3.5. Further, the first C/I measurement and second C/I measurement may be taken to be C/I measurement 524F and 524E, respectively. Because the difference between C/I measurements 524E and 524F exceeds the difference threshold (4 is greater than 3.5), the C/I-key value may be identified as 524F, having a value of 3.

While various examples of ways in which access terminal 102 may identify a C/I-key value are provided above, these examples should not be taken to be limiting. Other manners, methods, or techniques of determining a C/I-key value based on C/I measurements taken during C/I-evaluation time period 522 may be possible as well.

d. Select Next-Requested Forward-Link Data Rate

At step 308, access terminal 102 selects, based at least in part on the identified C/I-key value, a next-requested forward-link data rate from among the one or more data rates in the plurality that are less than the last-requested forward-link data rate.

For example, access terminal 102 may be arranged to respectively associate various C/I-key values with various forward-link data rates from among the plurality of requestable forward-link data rates, including associating the identified C/I-key value with the next-requested forward-link data rate. That is, access terminal 102 may use the C/I-key value as an index into a look-up table that contains an array of requestable forward-link data rates. As noted above, program data 210 may include such data-rate data, perhaps in the form of a look-up table that correlates particular forward-link data rates with particular C/I-key values.

As another example, access terminal 102 may be configured to calculate the next-requested forward-link data rate based at least in part on the C/I-key value. That is, program data 210 may include program instructions executable by the processor to cause the mobile device to calculate a desired next-requested forward-link data rate based on the C/I-key value.

In any event, the next-requested forward-link data rate is selected by access terminal 102 to be less than the last-requested forward-link data rate. As explained further with respect to step 310, access terminal may ultimately receive service from access node 402 at the next-requested forward-link data rate. Because the last-requested forward-link data rate (potentially) gave rise to an FPER that exceeded the FPER threshold (in accordance with step 302), requesting as the next-requested forward-link data rate a forward-link data rate that is less than the last-requested forward-link data rate may result in access terminal 102 receiving forward-link service at a forward-link data rate that does not lead to an FPER that exceeds the FPER threshold.

e. Request Forward-Link Service

At step 310, access terminal 102 requests forward-link service from serving access node 402 at the selected next-requested forward-link data rate. That is, after selecting the next-requested forward-link data rate, access terminal 102 may send a message to serving access node 402 requesting that serving access node 402 use the selected next-requested forward-link data rate for sending communications to access terminal 102. Access node 402 may then serve access terminal 102 at the selected next-requested forward-link data rate if possible.

f. First Set of Optional Additional Access Terminal Functions

In addition to those functions described with respect to method 300, access terminal 102 may optionally carry out additional functions to help refine the forward-link data rate at which it receives service from serving access node 402. An example of one such set of additional functions is shown with respect to method 320 in FIG. 3B. Generally, for purposes of method 320, the FPER and the C/I-key value that are referenced with respect to method 300 may be respectively designated the first FPER and the first C/I-key value.

As shown in FIG. 3B, method 320 begins at step 322 when, after requesting forward-link service from serving access node 402 at the selected next-requested forward-link data rate, access terminal 102 makes a third determination that a second FPER with respect to data received by access terminal 102 from serving access node 402 is greater than an FPER threshold. At step 324, access terminal 102 makes a fourth determination that the next-requested forward-link data rate is not the lowest data rate among a plurality of requestable forward-link data rates.

At step 326, responsive to making both the third and fourth determinations, access terminal 102 identifies a second C/I-key value based at least in part on one or more C/I measurements from among a set of C/I measurements taken by access terminal 102 with respect to one or more signals received from serving access node 402. At step 328, access terminal 102 selects, based at least in part on the identified C/I-key value, an additional requested forward-link data rate from among the one or more data rates in the plurality that are less than the next-requested forward-link data rate. And at step 330, access terminal 102 requests forward-link service from serving access node 402 at the selected additional requested forward-link data rate. Each of these steps is described further below.

At step 322, after requesting forward-link service from serving access node 402 at the selected next-requested forward-link data rate, access terminal 102 makes a third determination that a second FPER with respect to data received by access terminal 102 from serving access node 402 is greater than an FPER threshold. Thus, in the event that method 320 is carried out after method 300, at step 322, access terminal 102 makes a determination that the FPER with respect to data received from serving access node 402 is still undesirably high. Generally, the FPER threshold used in accordance with step 322 may be the same as the FPER threshold used in accordance with step 302, however this is not necessary.

At step 324, access terminal 102 makes a fourth determination that the next-requested forward-link data rate is not the lowest data rate among a plurality of requestable forward-link data rates. Similar to as described above with respect to step 304, by making the fourth determination that the next-requested forward-link data rate is not the lowest requestable forward-link data rate, access terminal 102, at least implicitly, ensures that there is at least one requestable forward-link data rate available, that is less than the next-requested forward-link data rate.

At step 326, responsive to making both the third and fourth determinations, access terminal 102 identifies a second C/I-key value based at least in part on one or more C/I measurements from among a set of C/I measurements taken by access terminal 102 with respect to one or more signals received from serving access node 402. Generally, the second C/I-key value may be identified in any way described with respect to identification of the first C/I-key value at step 306 of method 300.

Other examples of identifying the second C/I-key value may exist as well. As one example, in the case that the first C/I-key value reflects a given C/I-measurement value, the second C/I-key value may be identified based at least in part on a C/I measurement that is, among those C/I measurements 524A-524H that are less than the given C/I-measurement value, closest in value to the given C/I-measurement value. As another example, the second C/I-key value may be the C/I measurement that is the lowest C/I measurement of C/I measurements 524A-524H. Still other examples of identifying the second C/I-key value may exist as well.

At step 328, access terminal 102 selects, based at least in part on the identified C/I-key value, an additional requested forward-link data rate from among the one or more data rates in the plurality that are less than the next-requested forward-link data rate. Generally, access terminal 102 may select the additional requested forward-link data rate in any manner similar to which it selects the next-requested forward-link data rate as described with respect to step 308 of method 300. In any event, because the additional requested forward-link data rate may be selected by access terminal 102 to be less than the next-requested forward-link data rate, this selection may result in access terminal 102 receiving forward-link service at a potentially desirable forward-link data rate (e.g., a data rate that is lower than the next-requested forward-link data rate).

At step 330, access terminal 102 requests forward-link service from serving access node 402 at the selected additional requested forward-link data rate. That is, after selecting the additional requested forward-link data rate, access terminal 102 may send a message to serving access node 402 requesting that serving access node 402 use the selected additional requested forward-link data rate for sending communications to access terminal 102. Access node 402 may then serve access terminal 102 at the selected additional requested forward-link data rate if possible.

g. Second Set of Optional Additional Access Terminal Functions

As an alternative to those functions described with respect to method 320, and in addition to those functions described with respect to method 300, access terminal 102 may optionally carry out additional functions such as those shown with respect to method 340 in FIG. 3C. Generally, for purposes of method 340 the FPER, the C/I-key value, and the FPER threshold that are referenced with respect to method 300 may be respectively designated the first FPER, the first C/I-key value, and the first FPER threshold.

As shown in FIG. 3C, method 340 begins at step 342 when, after requesting forward-link service from serving access node 402 at the selected next-requested forward-link data rate, access terminal 102 makes a third determination that a second FPER with respect to data received by access terminal 102 from serving access node 402 is less than a second FPER threshold. At step 344, responsive to making the third determination, access terminal 102 identifies a second C/I-key value based at least in part on one or more C/I measurements from among a set of C/I measurements taken by access terminal 102 with respect to one or more signals received from serving access node 402.

At step 346, access terminal 102 selects, based at least in part on the identified C/I-key value, an additional requested forward-link data rate from among the one or more data rates in the plurality that are greater than the next-requested forward-link data rate. And at step 348, access terminal 102 requests forward-link service from serving access node 402 at the selected additional requested forward-link data rate. Each of these steps is explained further below.

At step 342, after requesting forward-link service from serving access node 402 at the selected next-requested forward-link data rate, access terminal 102 makes a third determination that a second FPER with respect to data received by access terminal 102 from serving access node 402 is less than a second FPER threshold. Thus, in the event that method 340 is carried out after method 300, at step 342, access terminal 102 makes a determination that the FPER with respect to data received from serving access node 402 is too low. Generally, the FPER threshold used in accordance with step 322 may be different from the FPER threshold used in accordance with step 302, however this is not necessary.

At step 344, responsive to making the third determination, access terminal 102 identifies a second C/I-key value based at least in part on one or more C/I measurements from among a set of C/I measurements taken by access terminal 102 with respect to one or more signals received from serving access node 402. Generally, the second C/I-key value may be identified in any way described with respect to identification of the first C/I-key value at step 306 of method 300.

However, with respect to method 340, access terminal 102 will select a C/I-key value that will result in the selection of a forward-link data rate that is greater than the next-requested forward-link data rate (given that the FPER was found to be too low in accordance with step 342). Thus, as one example, in the case that the first C/I-key value reflects a given C/I-measurement value, the second C/I-key value may be identified based at least in part on a C/I measurement that is, among those C/I measurements 524A-524H that are greater than the given C/I-measurement value, closest in value to the given C/I-measurement value. Still other examples of identifying the second C/I-key value may exist as well.

At step 346, access terminal 102 selects, based at least in part on the identified C/I-key value, an additional requested forward-link data rate from among the one or more data rates in the plurality that are greater than the next-requested forward-link data rate. Generally, access terminal 102 may select the additional requested forward-link data rate in any manner similar to which it selects the next-requested forward-link data rate as described with respect to step 308 of method 300.

In any event, because the additional requested forward-link data rate may be selected by access terminal 102 such that the additional requested forward-link data rate is greater than the next-requested forward-link data rate, selection of the additional requested forward-link data rate may result in access terminal 102 receiving forward-link service at a potentially desirable forward-link data rate (e.g., a data rate that is greater than the next-requested forward-link data rate).

At step 348, access terminal 102 requests forward-link service from serving access node 402 at the selected additional requested forward-link data rate. That is, after selecting the additional requested forward-link data rate, access terminal 102 may send a message to serving access node 402 requesting that serving access node 402 use the selected additional requested forward-link data rate for sending communications to access terminal 102. Access node 402 may then serve access terminal 102 at the selected additional requested forward-link data rate if possible.

3. Conclusion

Various exemplary embodiments have been described above. Those skilled in the art will understand, however, that changes and modifications may be made to those examples without departing from the scope of the claims.

The invention claimed is:

1. In a wireless-communication network comprising an access terminal that is being served by a serving access node, a method comprising:

the access terminal making a first determination that a forward-link packet error rate (FPER) with respect to data received by the access terminal from the serving access node is greater than an FPER threshold;

the access terminal making a second determination that a last-requested forward-link data rate is not the lowest data rate among a plurality of requestable forward-link data rates;

the access terminal making a third determination that a difference between a first C/I measurement and a second C/I measurement exceeds a difference threshold, wherein the second C/I measurement is greater than the first C/I measurement, and wherein the first and second C/I measurements are from among a set of C/I measurements taken by the access terminal with respect to one or more signals received from the serving access node;

responsive to making the first, second, and third determinations, the access terminal identifying a carrier-to-interference-(C/I)-key value based at least in part on one or more C/I measurements from among the set of C/I measurements taken by the access terminal with respect to one or more signals received from the serving access node;

the access terminal selecting, based at least in part on the identified C/I-key value, a next-requested forward-link data rate from among the one or more data rates in the plurality that are less than the last-requested forward-link data rate; and the access terminal requesting forward-link service from the serving access node at the selected next-requested forward-link data rate.

2. The method of claim 1, wherein the C/I-key value is at least one of (i) an average of the C/I measurements in the set, (ii) a C/I measurement that is, among those C/I measurements in the set that are less than the average of all of the C/I measurements in the set, closest in value to the average, (iii) a median of the C/I measurements in the set, and (iv) a C/I measurement that is, among those C/I measurements in the set that are less than the median, closest in value to the median.

3. The method of claim 1, wherein identifying the C/I-key value comprises identifying as the C/I-key value the lowest C/I measurement in the set.

4. The method of claim 1, wherein the second C/I measurement is, among those C/I measurements in the set that are greater than the first C/I measurement, closest in value to the first C/I measurement, and wherein identifying the C/I-key value comprises identifying as the C/I-key value the first C/I measurement.

5. The method of claim 1, with the FPER and the C/I-key value that are referenced in claim 1 now respectively designated the first FPER and the first C/I-key value, further comprising:

after requesting forward-link service from the serving access node at the selected next-requested forward-link data rate, the access terminal making a third determination that a second FPER with respect to data received by the access terminal from the serving access node is greater than the FPER threshold;

the access terminal making a fourth determination that the selected next-requested forward-link data rate is also not the lowest data rate among the plurality of requestable forward-link data rates;

responsive to making both the third and fourth determinations, the access terminal identifying a second C/I-key value based at least in part on one or more C/I measurements from among the set of C/I measurements;

the access terminal selecting, based at least in part on the identified second C/I-key value, an additional requested forward-link data rate from among the one or more data rates in the plurality that are less than the next-requested forward-link data rate; and the access terminal requesting forward-link service from the serving access node at the selected additional requested forward-link data rate.

6. The method of claim 5, wherein the first C/I-key value reflects a given C/I-measurement value, and wherein the second C/I-key value is identified based at least in part on a C/I measurement that is, among those C/I measurements in the set that are less than the given C/I-measurement value, closest in value to the given C/I-measurement value.

7. The method of claim 5, wherein identifying the second C/I-key value comprises identifying as the second C/I-key value the lowest C/I measurement in the set.

8. The method of claim 1, with the FPER, the C/I-key value, and the FPER threshold that are referenced in claim 1 now respectively designated the first FPER, the first C/I-key value, and the first FPER threshold, further comprising:

after requesting forward-link service from the serving access node at the selected next-requested forward-link data rate, the access terminal making a third determination that a second FPER with respect to data received by the access terminal from the serving access node is less than a second FPER threshold;

responsive to making the third determination, the access terminal identifying a second C/I-key value based at least in part on one or more C/I measurements from among the set of C/I measurements;

the access terminal selecting, based at least in part on the identified second C/I-key value, an additional requested forward-link data rate from among the one or more data rates in the plurality that are greater than the next-requested forward-link data rate; and the access terminal requesting forward-link service from the serving access node at the selected additional requested forward-link data rate.

9. The method of claim 8, wherein the first C/I-key value reflects a given C/I-measurement value, and wherein the second C/I-key value is identified based at least in part on a C/I measurement that is, among those C/I measurements in the set that are greater than the given C/I-measurement value, closest in value to the given C/I-measurement value.

10. The method of claim 1, wherein the access terminal is arranged to respectively associate various C/I-key values with various forward-link data rates from among the plurality of requestable forward-link data rates, including associating the identified C/I-key value with the next-requested forward-link data rate.

11. The method of claim 1, wherein using the C/I-key value to select the next-requested forward-link data rate comprises calculating the next-requested forward-link data rate based at least in part on the C/I-key value.

12. An access terminal that is being served by an access node in a wireless-communication network, the access terminal comprising:

a wireless-communication interface;

a processor; and data storage comprising program instructions executable by the processor for causing the mobile device to carry out functions including:

making a first determination that a forward-link packet error rate (FPER) with respect to data received by the access terminal from the serving access node is greater than an FPER threshold;

making a second determination that a last-requested forward-link data rate is not the lowest data rate among a plurality of requestable forward-link data rates;

making a third determination that a difference between a first C/I measurement and a second C/I measurement exceeds a difference threshold, wherein the second C/I measurement is greater than the first C/I measurement, and wherein the first and second C/I measurements are from among a set of C/I measurements taken by the access terminal with respect to one or more signals received from the serving access node;

responsive to making the first, second, and third determinations, the access terminal identifying a carrier-to-interference-(C/I)-key value based at least in part on one or more C/I measurements from among the set of C/I measurements taken by the access terminal with respect to one or more signals received from the serving access node;

selecting, based at least in part on the identified C/I-key value, a next-requested forward-link data rate from among the one or more data rates in the plurality that are less than the last-requested forward-link data rate; and requesting forward-link service from the serving access node at the selected next-requested forward-link data rate.

13. The access terminal of claim 12, wherein the C/I-key value is at least one of (i) an average of the C/I measurements in the set, (ii) a C/I measurement that is, among those C/I measurements in the set that are less than the average of all of the C/I measurements in the set, closest in value to the average, (iii) a median of the C/I measurements in the set, or (iv) a C/I measurement that is, among those C/I measurements in the set that are less than the median, closest in value to the median.

14. The access terminal of claim 12, wherein identifying the C/I-key value comprises identifying as the C/I-key value the lowest C/I measurement in the set.

15. The access terminal of claim 12, wherein the second C/I measurement is, among those C/I measurements in the set that are greater than the first C/I measurement, closest in value to the first C/I measurement, and wherein identifying the C/I-key value comprises identifying as the C/I-key value the first C/I measurement.

16. The access terminal of claim 12, with the FPER and the C/I-key value that are referenced in claim 12 now respectively designated the first FPER and the first C/I-key value, the data storage further comprising instructions for:

after requesting forward-link service from the serving access node at the selected next-requested forward-link data rate, making a third determination that a second FPER with respect to data received by the access terminal from the serving access node is greater than the FPER threshold;

making a fourth determination that the selected next-requested forward-link data rate is also not the lowest data rate among the plurality of requestable forward-link data rates;

responsive to making both the third and fourth determinations, identifying a second C/I-key value based at least in part on one or more C/I measurements from among the set of C/I measurements;

selecting, based at least in part on the identified second C/I-key value, an additional requested forward-link data rate from among the one or more data rates in the plurality that are less than the next-requested forward-link data rate; and the access terminal requesting forward-link service from the serving access node at the selected additional requested forward-link data rate.

17. The access terminal of claim 16, wherein the first C/I-key value reflects a given C/I-measurement value, and wherein the second C/I-key value is identified based at least in part on a C/I measurement that is, among those C/I measurements in the set that are greater than the given C/I-measurement value, closest in value to the given C/I-measurement value.

18. The access terminal of claim 16, wherein identifying the second C/I-key value comprises identifying as the second C/I-key value the lowest C/I measurement in the set.

19. The access terminal of claim 12, with the FPER, the C/I-key value, and the FPER threshold that are referenced in claim 12 now respectively designated the first FPER, the first C/I-key value, and the first FPER threshold, the data storage further comprising instructions for:

after requesting forward-link service from the serving access node at the selected next-requested forward-link data rate, making a third determination that a second FPER with respect to data received from the serving access node is less than a second FPER threshold;

responsive to making the third determination, identifying a second C/I-key value based on one or more C/I measurements from among the set of C/I measurements;

using the identified second C/I-key value to select an additional-requested forward-link data rate from among the one or more data rates in the plurality that are greater than the next-requested forward-link data rate; and requesting forward-link service from the serving access node at the selected additional-requested forward-link data rate.

20. The access terminal of claim 19, wherein the identified first C/I-key value reflects a given C/I-measurement value, and wherein the identified second C/I-key value is identified based on at least a C/I measurement that is, among those C/I measurements in the set that are greater than the given C/I-measurement value, closest in value to the given C/I-measurement value.

21. The access terminal of claim 12, the data storage further comprising instructions for:

respectively associating various C/I-key values with various forward-link data rates from among the plurality of requestable forward-link data rates, including associating the identified C/I-key value with the next-requested forward-link data rate.

22. The access terminal of claim 12, wherein using the C/I-key value to select the next-requested forward-link data rate comprises calculating the next-requested forward-link data rate based at least in part on the C/I-key value.

* * * * *